(12) United States Patent
Tamm et al.

(10) Patent No.: US 12,003,069 B2
(45) Date of Patent: Jun. 4, 2024

(54) FASTENING SYSTEM FOR AN ELECTRICAL TRANSMISSION LINE REPAIR DEVICE

(71) Applicant: Classic Connectors, Inc., Trussville, AL (US)

(72) Inventors: Carl Russel Tamm, Trussville, AL (US); Randy L Wolf, Trussville, AL (US); Brent Fields, Goodlettsville, TN (US); Jonathan Prinsloo, Odenville, AL (US)

(73) Assignee: CLASSIC CONNECTORS, INC., Clinton, OH (US)

( * ) Notice: Subject to any disclaimer, the term of this patent is extended or adjusted under 35 U.S.C. 154(b) by 0 days.

(21) Appl. No.: 18/102,631

(22) Filed: Jan. 27, 2023

(65) Prior Publication Data

US 2023/0282992 A1 Sep. 7, 2023

Related U.S. Application Data

(63) Continuation of application No. 16/888,759, filed on May 31, 2020, now Pat. No. 11,569,591.

(51) Int. Cl.
*H01R 4/30* (2006.01)
*F16B 33/02* (2006.01)
*F16B 37/04* (2006.01)
*H01R 4/36* (2006.01)

(52) U.S. Cl.
CPC ............. *H01R 4/304* (2013.01); *F16B 33/02* (2013.01); *F16B 37/045* (2013.01); *H01R 4/36* (2013.01)

(58) Field of Classification Search
CPC .. H01R 4/304; H01R 4/36; H01R 4/42; F16B 33/02; F16B 37/045
See application file for complete search history.

(56) References Cited

U.S. PATENT DOCUMENTS 7,699,669 B2 * 4/2010 Sweeney ................ H01R 4/366
439/791
2017/0187128 A1 * 6/2017 Peltier ...................... H01R 4/62

FOREIGN PATENT DOCUMENTS

FR 2731556 A1 * 9/1996 ............. H01R 4/363

* cited by examiner

*Primary Examiner* — Travis S Chambers
(74) *Attorney, Agent, or Firm* — The Watson IP Group, PLC; Jovan N. Jovanovic

(57) ABSTRACT

A fastening system has a conditioner clamp and a penetrating fastener. The conditioner clamp has an upper assembly and a lower assembly attachable together to define a conductor cavity therebetween. At least one threaded opening provides ingress into the conductor cavity. The penetrating fastener is extendable through the at least one threaded opening. The penetrating fastener has a threaded bolt and a penetrating portion with a proximal end at a second end region of the threaded bolt and a distal end spaced therefrom. The penetrating portion has a frustoconical configuration terminating at a tip portion. The tip portion is configured to penetrate into a conductor positioned within the conductor cavity.

17 Claims, 12 Drawing Sheets

FASTENING SYSTEM FOR AN ELECTRICAL TRANSMISSION LINE REPAIR DEVICE

CROSS-REFERENCE TO RELATED APPLICATION

The present application is a continuation of U.S. patent application Ser. No. 16/888,759 filed on May 31, 2020, and is now granted as U.S. Pat. No. 11,569,591, issued on Jan. 31, 2023, entitled "FASTENING SYSTEM FOR AN ELECTRICAL TRANSMISSION LINE REPAIR DEVICE", the entire specification of which is hereby incorporated by reference in its entirety.

BACKGROUND OF THE DISCLOSURE

1. Field of the Disclosure

The disclosure relates in general to electrical transmission repair devices suitable for use with electrical transmission and distribution lines, and more particularly, to a fastening system for an electrical transmission line repair device, and, an electrical transmission line repair device having a fastening system.

2. Background Art

Electrical transmission lines are well known in the art and include commonly known overhead types. Such types of electrical transmission lines comprise a core formed from metal members, as well as composite members having an outer conductive cladding extending around the core, typically made from an aluminum or aluminum alloy (although other conductors are likewise contemplated). These electrical transmission lines crisscross the globe and define our electrical grids.

While these conductors are intended to last decades, as the electrical grids age, damage to conductors occurs, which can lead to further deterioration and weakening. Eventually, the conductor can be weakened to a degree insufficient to support the normal tension of the conductor and will fail. While it is desirable to replace these conductors with new conductors, in some instances, such reconductoring can be difficult to achieve for a period of time due to regulatory issues, labor issues, weather related issues, budget issues, among others. Thus, utilities employ a number of different measures or means to extend the life of the aging conductors by restoring the integrity to the deteriorated locations of the conductors and connectors.

As an alternative to replacement, or as a delay to replacement, solutions have been implemented to support or otherwise improve an area of a conductor (often proximate a splice, a dead end or the like). Such solutions include U.S. Pat. No. 7,794,291 issued to Goch; U.S. Pat. No. 9,761,960 issued to Tamm, and U.S. Pat. No. 9,577,354 issued to Wolf et al., each of these foregoing patents are incorporated by reference in their entirety in the present disclosure.

Such solutions provide additional support and strength to the system allowing extended use of the underlying conductor. Increasing the retention strength of the foregoing solutions, as well as other solutions where clamping of old conductor portions is utilized to achieve a shunt or support would be deemed advantageous. This is true of the foregoing solutions, as well as other solutions that rely on clamping type couplings and/or that incorporate attachment onto a conductor.

SUMMARY OF THE DISCLOSURE

The disclosure is directed to a fastening system comprising a conditioner clamp and a penetrating fastener. The conditioner clamp has an upper assembly and a lower assembly attachable together to define a conductor cavity therebetween. At least one threaded opening provides ingress into the conductor cavity. The penetrating fastener is extendable through the at least one threaded opening. The penetrating fastener has a threaded bolt and a penetrating portion with a proximal end at a second end region of the threaded bolt and a distal end spaced therefrom. The penetrating portion has a frustoconical configuration terminating at a tip portion. The tip portion is configured to penetrate into a conductor positioned within the conductor cavity, thereby directing a compression force onto a core of the conductor.

In some configurations, the at least one threaded opening comprises a plurality of threaded openings. The fastening system further includes a clamp fastener extendable through at least one threaded opening. The clamp fastener has a threaded bolt and a keeper positioned at a second region thereof and having a conductor engaging end structurally configured to engage a conductor and force the conductor against the conditioner clamp within the conductor cavity so as to sandwich the conductor therebetween.

In some configurations, the penetrating portion is formed as a part of a penetrating attachment that is attachable to the threaded bolt, which is a separate component.

In some configurations, the penetrating attachment is attached to the threaded bolt with at least one pin extending through respective cross-bores in each of the threaded bolt and the penetrating attachment.

In some configurations, the upper assembly and the lower assembly are attached through an attachment assembly having a first side connector and a second side connector, opposite the first side connector, wherein the upper assembly and the lower assembly are slidably attachable to each other.

In some configurations, the tip portion has a substantially planar surface that is generally perpendicular to the conductor cavity.

In some configurations, the fastening system further includes at least two clamp fasteners and at least two penetrating fasteners, installed in alternating fashion through the openings.

In some configurations, the fastening system further includes at least two clamp fasteners and at least one penetrating fastener. The at least one penetrating fastener is positioned in an opening that is between adjacent openings, each of which has a clamp fastener extending therethrough.

In some configurations, the threaded bolt of the clamp fastener and the threaded bolt of the penetrating fastener are substantially identical.

In some configurations, the side surface of the penetrating portion comprises a linear frustoconical configuration.

In some configurations, the side surface of the penetrating portion comprises an arcuate frustoconical configuration.

In some configurations, the proximal end of the penetrating portion has a diameter that is smaller than the diameter of the at least one threaded opening.

In some configurations, the at least one threaded opening comprises a plurality of threaded openings aligned in a spaced apart linear fashion along the conductor clamp.

In some configurations, the plurality of threaded openings are positioned on the upper assembly.

In another aspect of the disclosure, the disclosure is directed to a penetrating fastener form use in association with an electrical transmission line repair device. The penetrating fastener comprises a threaded bolt and a penetrating attachment. The threaded bore has a first end and a second end region, with a tool engaging structure at the first end. The penetrating attachment is coupled to the second end region of the threaded bore. The penetrating attachment has a penetrating portion with a proximal end and a distal end. The penetrating portion has a frustoconical configuration terminating with a tip portion and defined by a side surface between the proximal end and the distal end.

In some configurations, the penetrating attachment includes a coupling portion extending from the penetrating portion. The coupling portion includes an interfacing bore into which the second region of the threaded bolt is releasably insertable.

In some configurations, at least one pin extends through respect cross-bores in each of the threaded bolt and the penetrating attachment securing the same.

In some configurations, the penetrating fastener further includes a biasing assembly positioned between the penetrating attachment and the second end region. The biasing assembly includes a first washer, a second washer and a Belleville washer therebetween, with the first washer engaging the threaded bolt and the second washer engaging the penetrating attachment.

In yet another aspect of the disclosure, the disclosure is direct to a method of clamping a conductor within a fastening system, comprising the steps of: providing a conductor clamp having a conductor cavity extending along the length thereof and including a plurality of threaded openings providing ingress into the conductor cavity; inserting a conductor into the conductor cavity, the conductor having a core and a plurality of conductive strands encircling the core; providing a clamp fastener, having a second end region with a keeper; extending the clamp fastener through a first of the threaded openings; providing a penetrating fastener, having a second end region with a penetrating portion; extending the penetrating fastener through a second of the threaded openings; tightening the clamp fastener, to clamp the conductor against the conductor clamp; and tightening the penetrating fastener, to penetrate at least a portion of the conductor.

In some configurations, the conductor includes a core and a plurality of conductive strands encircling the core, the step of tightening the penetrating fastener further comprising the step of penetrating the conductive strands sufficient to reach near the core. It will be understood that in some instances the strands may be severed, with others (and at times the majority of the strands) will be crushed compacting the aluminum conductor around the core.

In some configurations, the step of tightening the penetrating fastener penetrates at least a portion of the conductor such that between 20% and 100% of a radial thickness of the conductive strands that encircle the core, and more preferably between 30% and 80% of the radial thickness of the conductive strands.

BRIEF DESCRIPTION OF THE DRAWINGS

The disclosure will now be described with reference to the drawings wherein.

DETAILED DESCRIPTION OF THE DISCLOSURE

Figure 1:
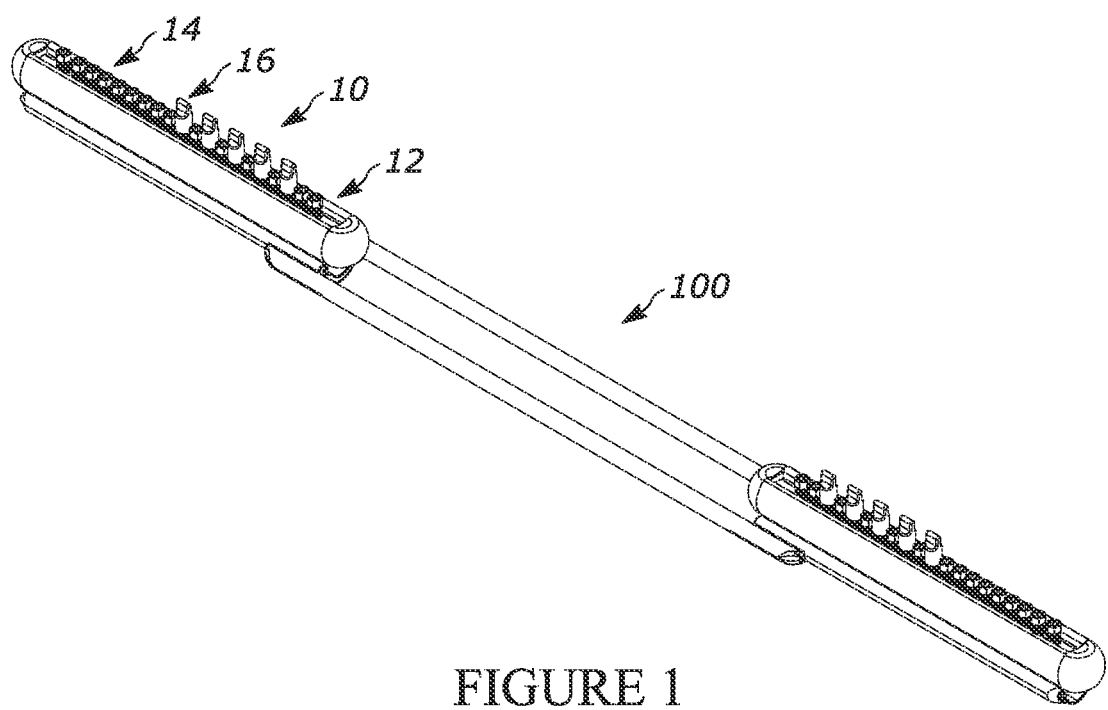
FIG. 1 of the drawings is a perspective view of an electrical transmission line repair device having the fastening of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a fastening system for an electrical transmission line repair device (100) is shown generally at 10. The fastening system can be utilized to form a support and/or electrical shunt around a damaged or compromised area of an electrical conductor. Some configurations can be seen in the above-identified incorporated references, and, for example, in the '354 patent issued to Wolf et al, above. The '354 patent details the configuration of the particular conductor clamps, and those clamps will be shown herein, with the understanding that the present disclosure is not limited to the particular clamps shown, or to the clamps of the '354 patent. However, the system shown herein is well suited for use therewith.

Figure 2:
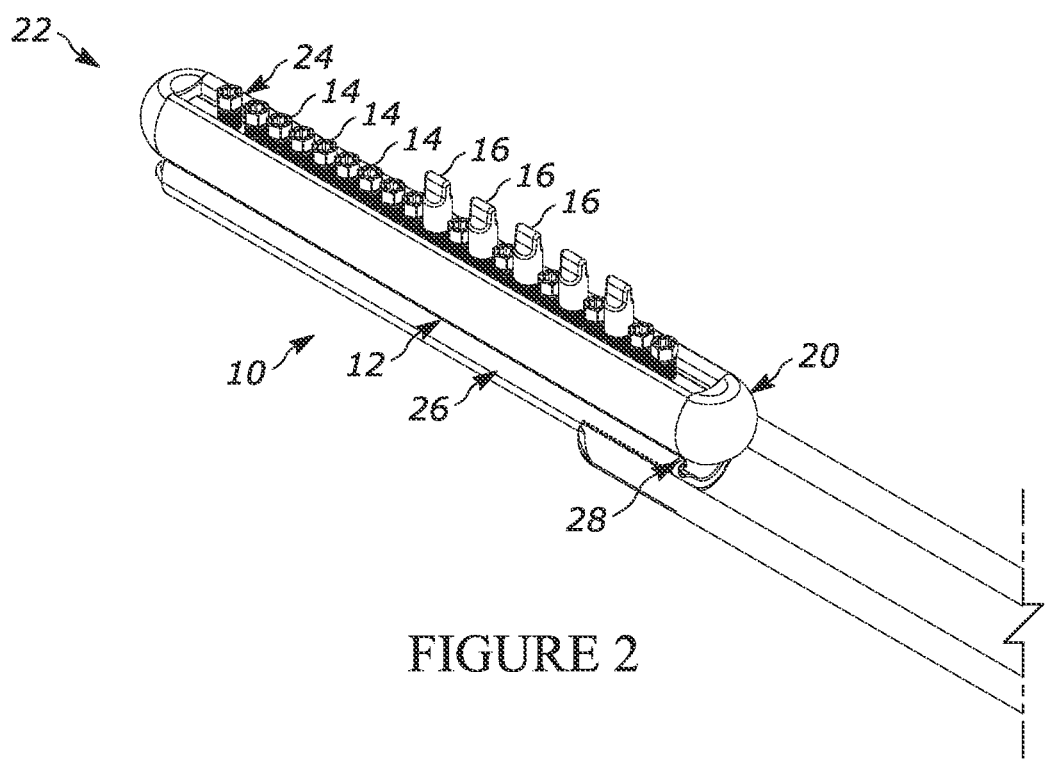
FIG. 2 of the drawings is a perspective view of the fastening system of the present disclosure.

With reference to FIGS. 1 and 2, the fastening system 10 is shown as comprising conductor clamp 12, clamp fasteners 14 and penetrating fasteners 16. The conductor clamp has an inner end 20 and an outer end 22. It will be understood that the inner end is positioned to face the compromised region of the conductor that is being strengthened/bypassed by the overall repair device. And, the outer end is distally spaced relative to the proximal end relative to the region that is being bypassed.

Figure 3:
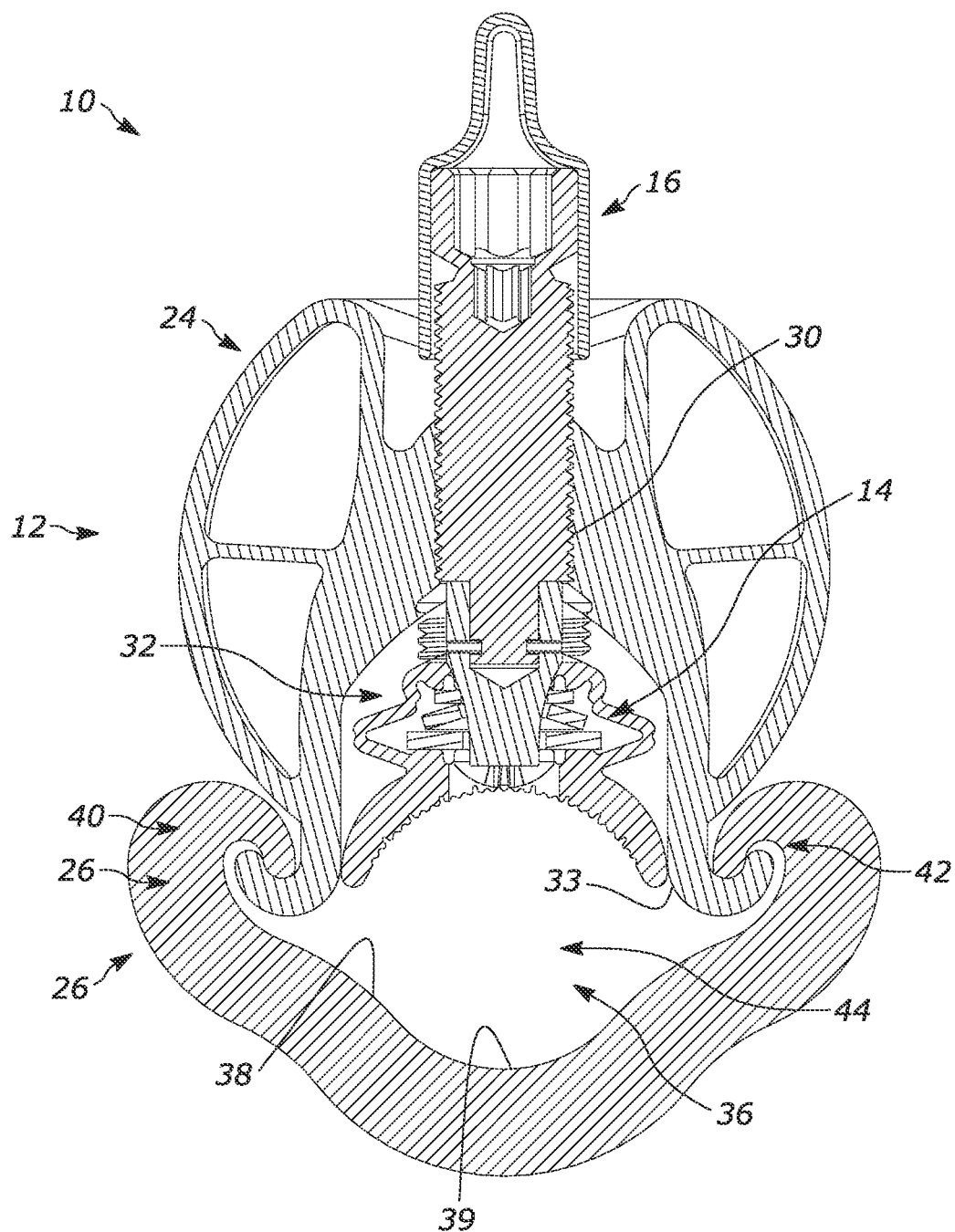
FIG. 3 of the drawings is a cross-sectional view of the fastening system of the present disclosure.

With additional reference to FIG. 3, the conductor clamp 12 includes an upper assembly 24 and a lower assembly 26, that are attached together through an attachment assembly, such as attachment assembly 28 so as to form a conductor cavity 44, which has an elongated tubular configuration. The details of such a conductor clamp are set forth in the incorporated '354 patent.

The upper assembly 24 includes a plurality of threaded openings 30 that extend linearly between the inner end and the outer end of the upper assembly. The threaded openings extend from the outer surface through the assembly and into the longitudinal channel 32, which defines an inner surface 33. Generally, the threaded openings are spaced apart from each other and are positioned in single file. In the configuration shown, the spacing between the threaded openings are substantially uniform. Variations to each of the foregoing are contemplated. The threaded openings extend into the longitudinal channel in a generally orthogonal configuration relative to the longitudinal axis of the channel, such that they contact a conductor generally perpendicular to a tangent of the outer surface of a conductor opposite the lower portion 39 of the inner surface 38 of the lower assembly 26.

The lower assembly 26 includes a matingly configured longitudinal channel 36 which defines an inner surface 38, with a lower portion 39 onto which the conductor is positioned. The upper and lower assemblies are generally of similar length, while variations are contemplated.

The attachment assembly 28 is shown as comprising first side connector 40 and second side connector 42. The connectors comprise interacting tab and slot configurations which facilitate slidable attachment of the upper assembly 24 relative to the lower assembly 26. That is, the two assemblies can be slid relative to each other to be releasably retained relative to each other. When installed together, the two assemblies are not separable or able to be pulled apart from each other, while they can be slid relative to each other along the longitudinal axis that generally defines the path of the conductor therethrough. Collectively, when coupled together, the upper assembly and the lower assembly form a conductor cavity 44 from the individual longitudinal channels of each of them.

Figure 4:
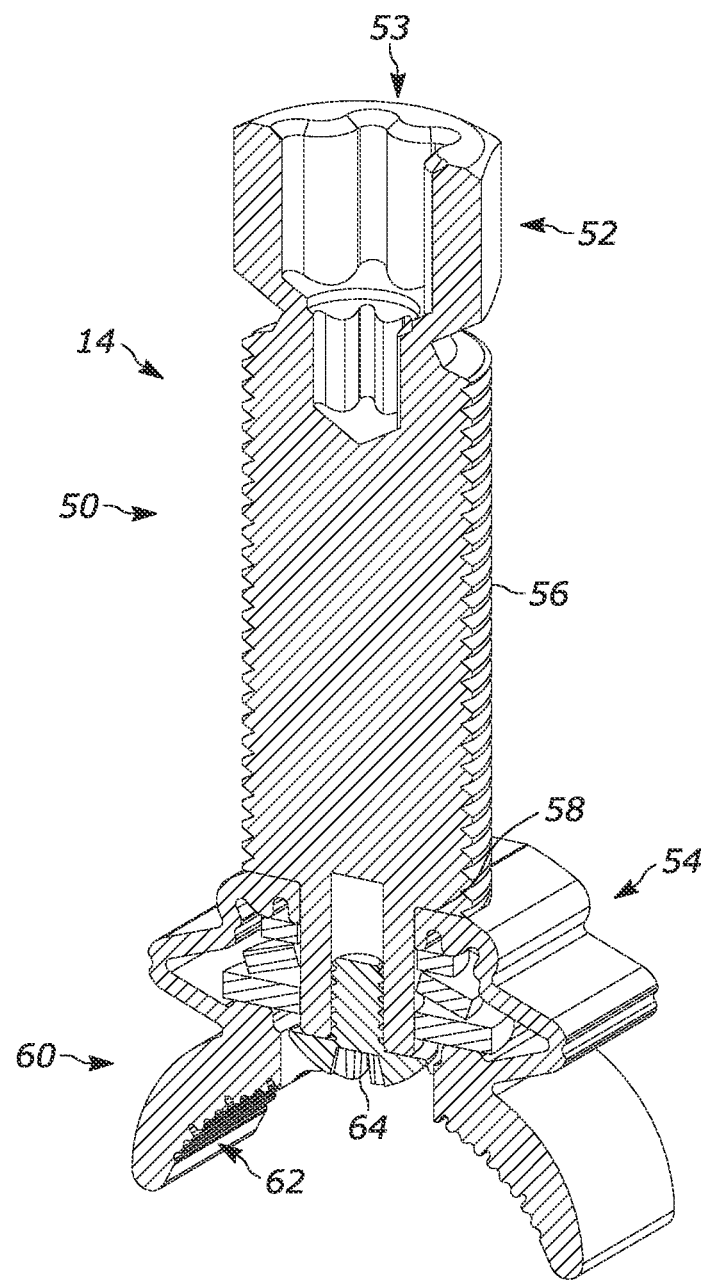
FIG. 4 of the drawings is a cross-sectional perspective view of the clamp fastener of the fastening system of the present disclosure.
Figure 5:
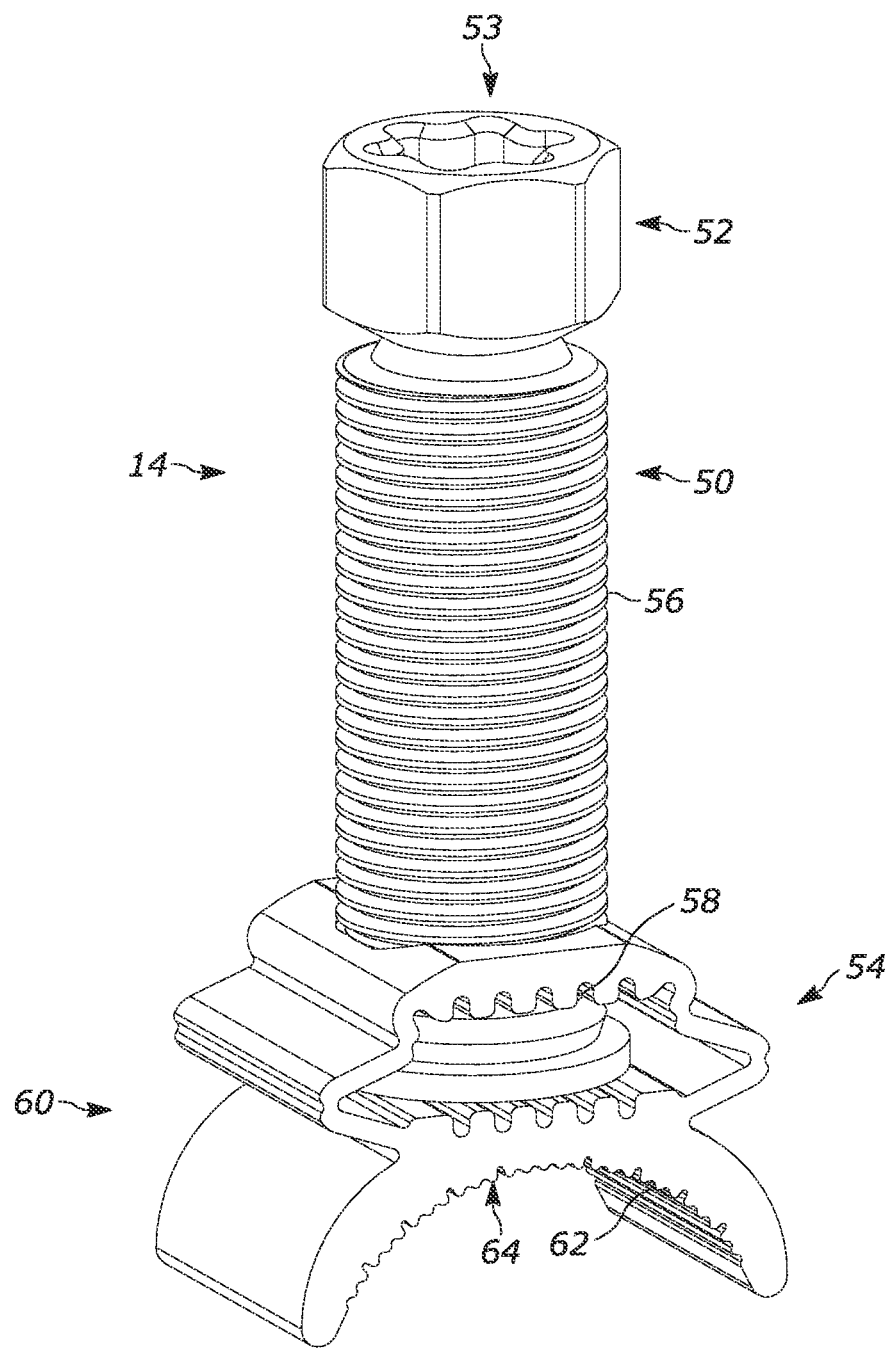
FIG. 5 of the drawings is a perspective view of the clamp fastener of the fastening system of the present disclosure.
Figure 6:
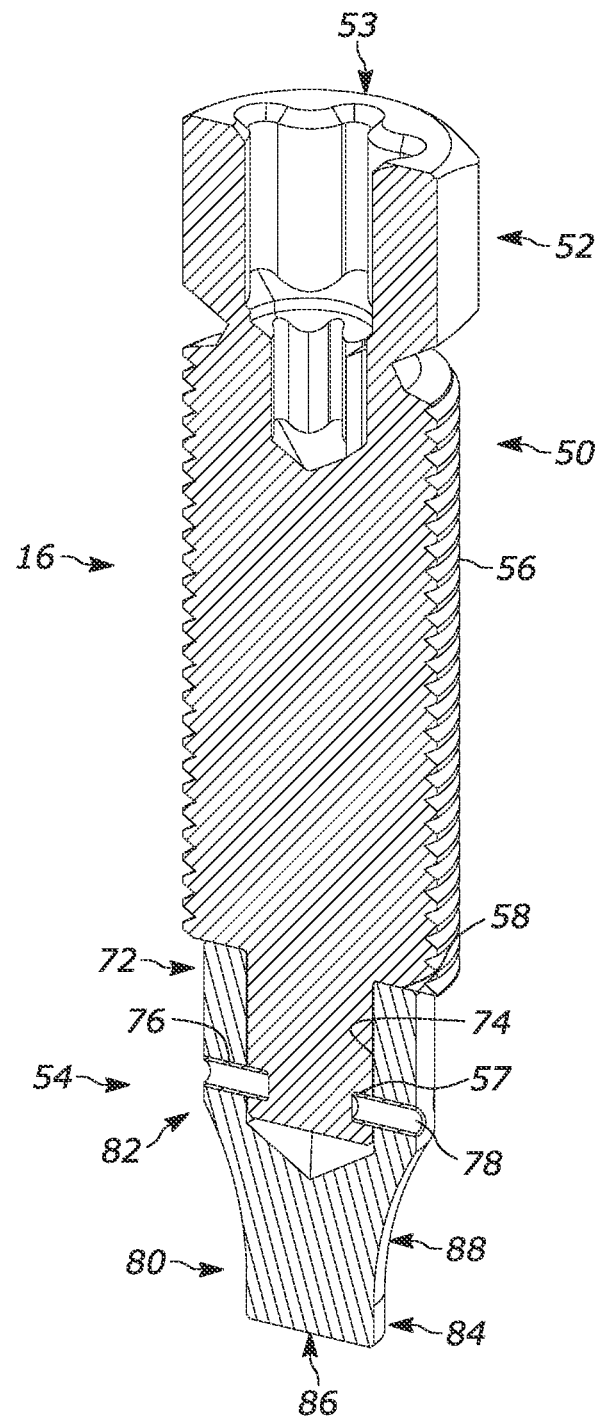
FIG. 6 of the drawings is a cross-sectional perspective view of the penetrating fastener of the fastening system of the present disclosure.
Figure 7:
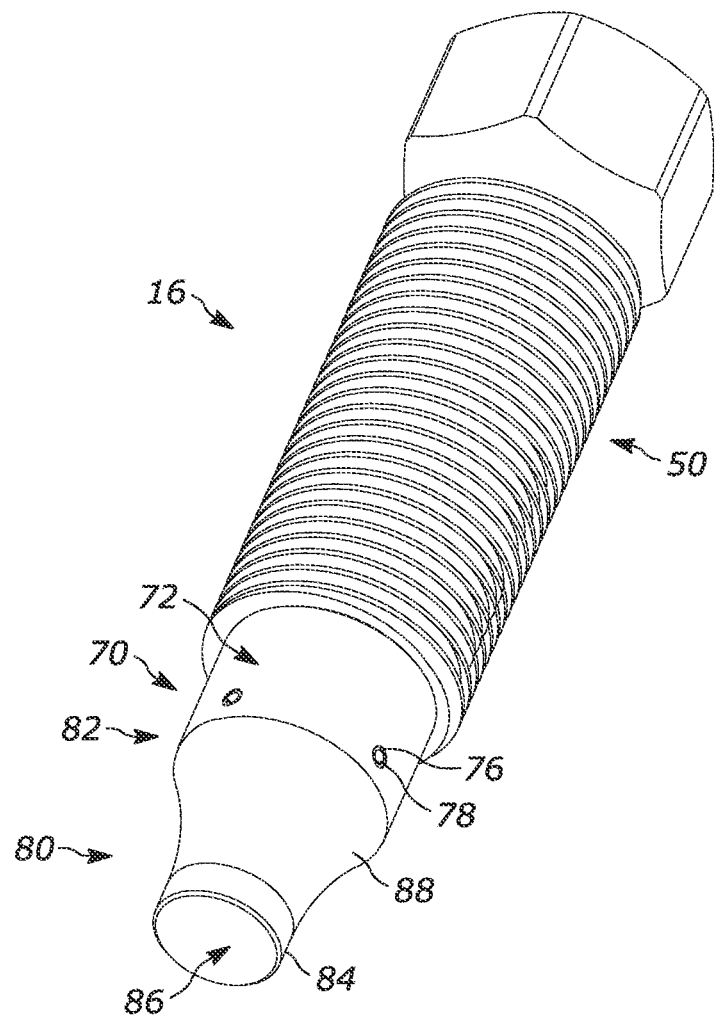
FIG. 7 of the drawings is an end perspective view of the penetrating fastener of the fastening system of the present disclosure.
Figure 8:
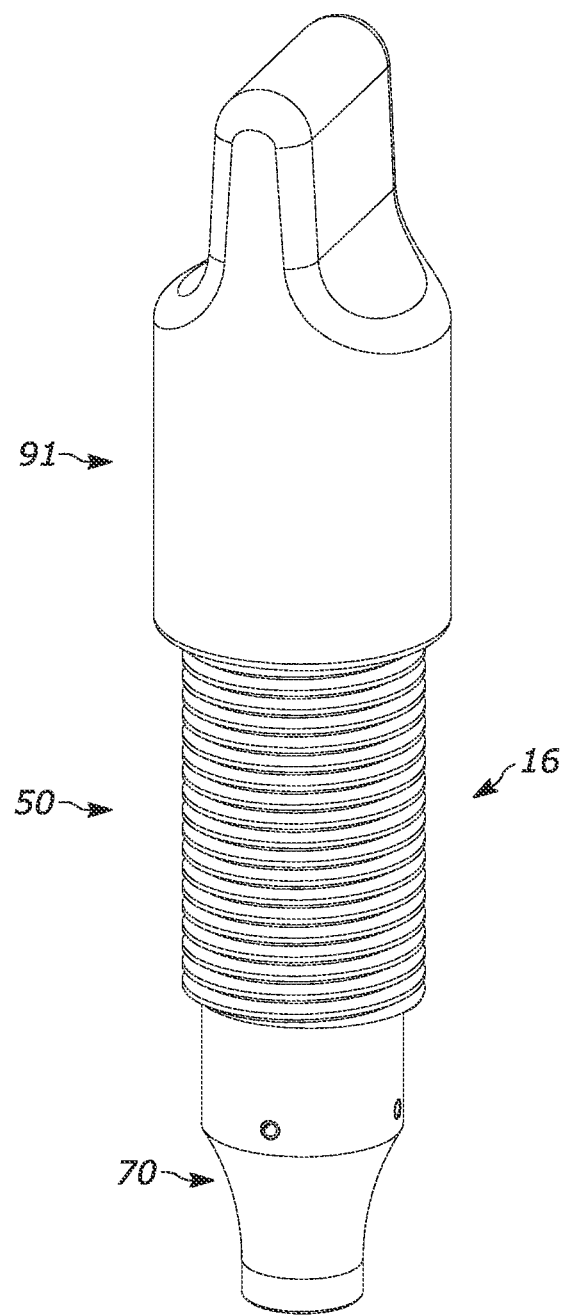
FIG. 8 of the drawings is a perspective view of the penetrating fastener of the fastening system of the present disclosure.
Figure 9:
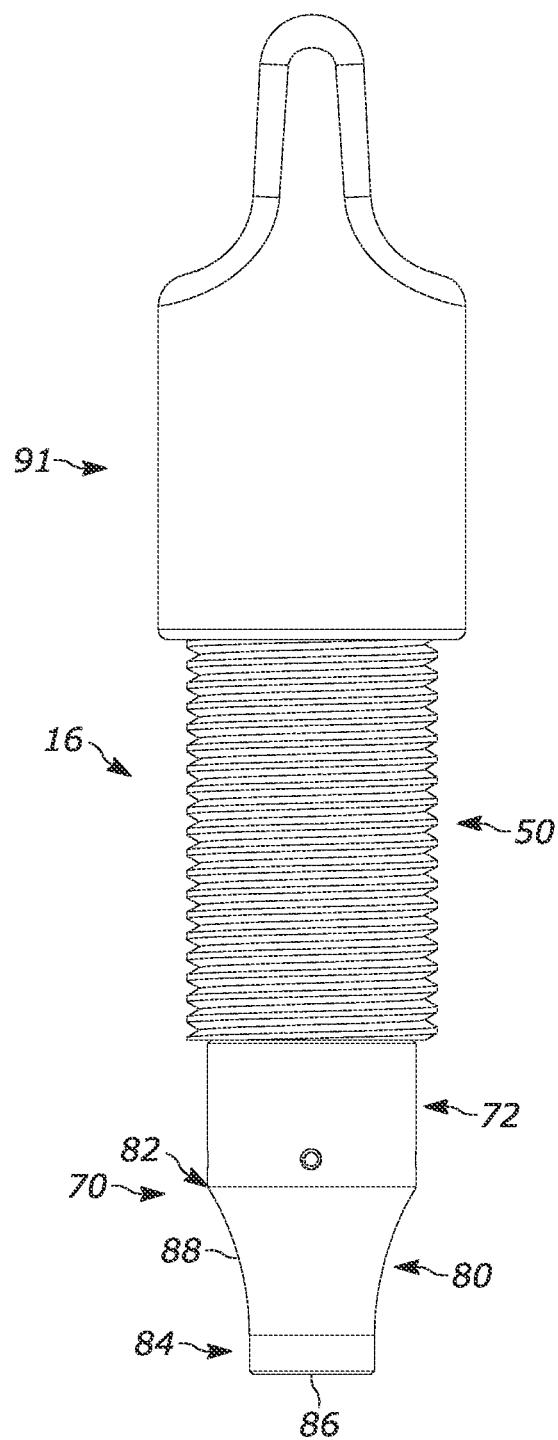
FIG. 9 of the drawings is a side elevational view of the penetrating fastener of the fastening system of the present disclosure.

The clamp fasteners 14 are shown in FIGS. 4 and 5 as comprising a threaded bolt 50 and a keeper 60. A number of different configurations of the clamp fasteners is contemplated for use, including, but not limited to the configuration shown in U.S. Pat. No. 9,343,823 issued to Tamm et al, the entire disclosure of which is hereby incorporated by reference in its entirety. Of course, other clamping type fasteners are contemplated for use, and the disclosure is not limited to the clamp fastener that is shown and described.

The threaded bolt 50 includes first end 52, second end region 54, threadform 56 and step down flange 58. The first end 52 includes a tool engaging structure 53 which may, for example comprise an internal hex pattern (for use with an allen type, or torx type tool, among others), or an external configuration (for use with, for example, a socket, a wrench, or the like, among others). In addition to the '823 patent, another tool engaging structure is disclosed in U.S. Pat. No. 9,689,416 issued to Tamm, et al, the entire disclosure of which is hereby incorporated by reference in its entirety.

The threadform 56 extends about the outer surface and is a threadform that mates with the threaded openings 30 of the upper assembly 24. The step down flange 58 is at the second end region and represents a change in the diameter of the threaded bolt. The step down flange 58 leads to a cylindrical lower end. In the configuration shown, the lower end is substantially cylindrical and concentric with the portion of the threaded bolt that has the threadform therealong.

The keeper 60 includes a conductor engaging end 62 which represents an outwardly concave surface that is configured to contact and engage the conductor (and to facilitate shape retention of the conductor during clamping, preferably. The keeper further includes a bolt coupling 64 which attaches the keeper to the threaded bolt 50 in a secured engagement.

It will be understood that different clamp fasteners are likewise contemplated including such fasteners that have different conductor contacting surfaces. In some instances, the contacting surfaces may be other than outwardly concave, such as, for example, outwardly convex or planar, among other configurations. Preferably, the clamp fasteners minimize distortion of the conductor and apply a force across an area of the conductor so as to more preferably clamp rather than pierce the conductor (while some piercing may occur at the interface with the surface).

The penetrating fasteners 16 are shown in FIGS. 6 through 9 in greater detail as comprising threaded bolt, similar to threaded bolt 50 described above, and penetrating attachment 70. The threaded bolt 50 is similar to that of, or may be identical to that utilized with the clamp fasteners 14. It is contemplated that the threaded bolt may include cross bores, such as cross bore 57 that extends through the cylindrical lower portion of the threaded bolt. Of course, other configurations are contemplated, however the use of a similar if not identical threaded bolt allows for the minimizing of componentry.

The penetrating attachment 70 is shown as comprising coupling 72 and penetrating portion 80. The coupling 72 is configured to mate with the cylindrical portion of the threaded bolt. The coupling includes interfacing bore 74 and crossbores 76. The bore 74 is configured to receive the cylindrical portion of the threaded bolt. When inserted thereinto, the crossbores 76 matingly align with the crossbores 57. Pins, such as pins 78 can be inserted to couple the crossbores 76 to the crossbores 57 to rotationally and axially couple the structures to each other. In some configurations, the two can be releasably coupled to each other, with different structures, such as keys, snap rings, or other structures, or may be releasably only matingly attached.

The penetrating portion 80 is shown as comprising proximal end 82, distal end 84, tip portion 86 and side surface 88. In the configuration shown, the penetrating portion 80 comprises a frustoconical configuration terminating at tip portion 86. In the configuration shown, the tip portion has a substantially flat configuration that has a circular cross-sectional configuration. In the configuration shown, the tip portion has a diameter of 0.375", while both smaller and larger diameters (and corresponding surface areas wherein the structures are other than circular) are contemplated. It has been found that such a configuration is capable of piercing into the conductor while resisting deformation through the shear loading due to the tension of the conductor. In the configuration shown, the frustoconical configuration is defined by side surface 88 in which the rate of change is varied (i.e., not linear), however, in other configurations, other side surfaces are contemplated, such as linear surfaces. In the configuration shown, the diameter of the penetrating portion at the proximal end is between 1.2 and 2.5 times that of the tip portion. The height of the conical portion is between 1.2 and 2.5 times the diameter of the tip. Of course, variations are contemplated. It is desirable, but not required to decrease the cross-section of the tip to promote penetration, while enhancing the cross-section away from the tip to provide resistance to deformation due to torsion. Relative ratios can be seen in the Figures, for exemplary and non limiting purposes only.

Figure 12:
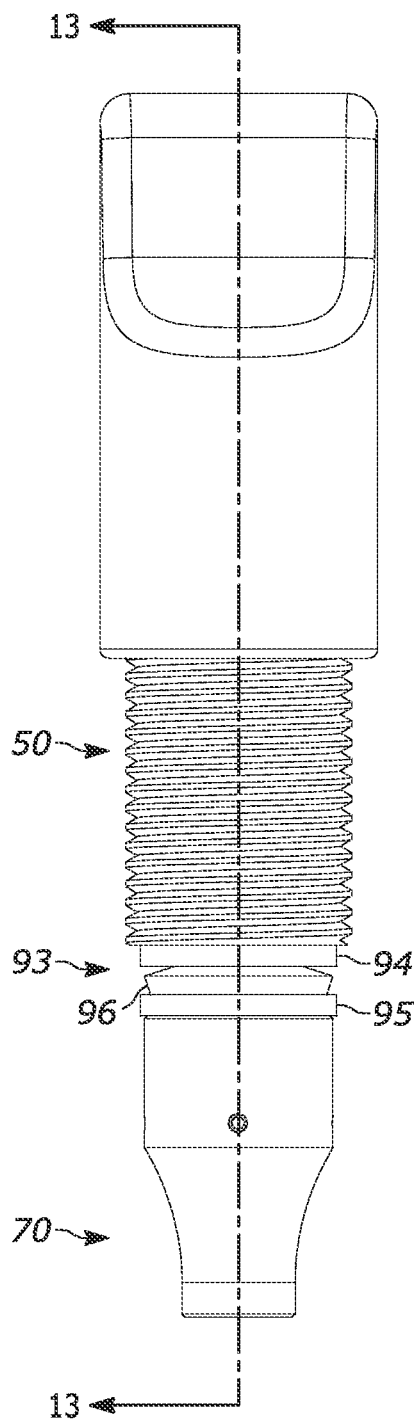
FIG. 12 of the drawings is a side elevational view of a configuration of the penetrating fastener of the fastening system of the present disclosure.
Figure 13:
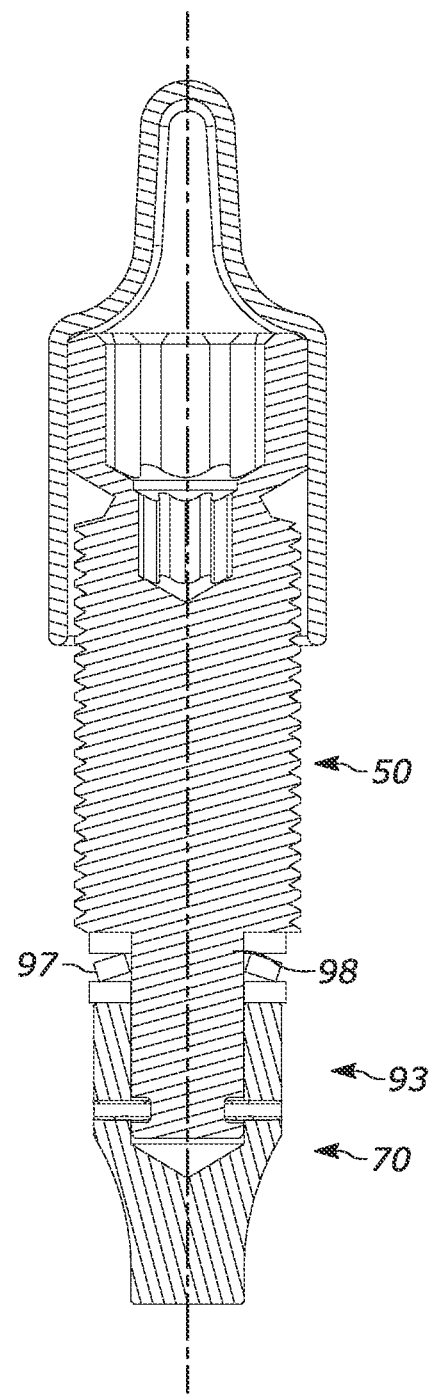
FIG. 13 of the drawings is a cross-sectional view of the penetrating fastener of the fastening system of the present disclosure, taken generally about lines 13-13 of FIG. 12.

In a configuration of the penetrating fastener shown in FIGS. 12 and 13, a biasing assembly 93 can be provided between the penetrating portion and the threaded bolt. The biasing assembly includes a first outer washer 94 and a second outer washer 95 with a Belleville washer 96 positioned therebetween. The Belleville washer 96 includes an outer edge 97 and inner edge 98. When loaded, the Belleville washer engages these surfaces and reduces the possibility of the fastener from loosening due to surface deformation of the surfaces co-acting with the Belleville washer. It will be understood that a single Belleville washer 96 is shown, with the understanding that multiple Belleville washers may be stacked up together. Additionally, a single washer is shown on either side of the Belleville washer, while it will be understood that multiple washers may be utilized on either side of the Belleville washer. It will further be understood that the use of Belleville washers is disclosed in conjunction with the clamp fasteners, above, in the incorporated by reference '823 patent.

With reference to FIG. 1, the overall device 100 is configured with opposing conductor clamps. The discussion will focus on one conductor clamp with the understanding that the conductor clamps can be configured in the same or a similar manner. In the configuration shown, the upper assembly of the conductor clamp has twenty threaded openings (and for purposes of discussion, the opening closest to the inner end will be referred to as the first opening, with the final opening closest to the outer end being the last or twentieth opening). In the configuration contemplated, it is desirable to utilize both clamp fasteners and penetrating fasteners, as the two different types of fasteners provide synergies when utilized together (although it is contemplated that solely one type or another type (or a hybrid) can be used in different configurations.

More specifically, and preferably, the clamp fasteners are utilized to clamp and retain (although the clamp fasteners may have some penetration or deformation of the surface of the conductor strands) the conductor, and to generally maintain the shape of the container. As, typically, the conductor strands are helically wound, and the openings define an elongated structure, preferably at least one (and typically more) the clamping fasteners generally directly apply a clamping force on each of the conductor strands. The piercing fasteners are configured to penetrate through the conductor, and preferably reach close to or to the core (and in the configuration contemplated, focusing 7500 pounds of force on the tip, while greater or lesser forces are likewise contemplated, and this figure is to be deemed exemplary, with the ⅜" diameter, for example, represents a concentrated compressive force of approximately 67,906 lbs per square inch). Without the clamp fasteners, there is a concern (which may or may not happen), that the piercing fasteners will push the conductor strands apart and slip between strands, rather than compressing and piercing into the strands to drive toward the core.

Figure 10:
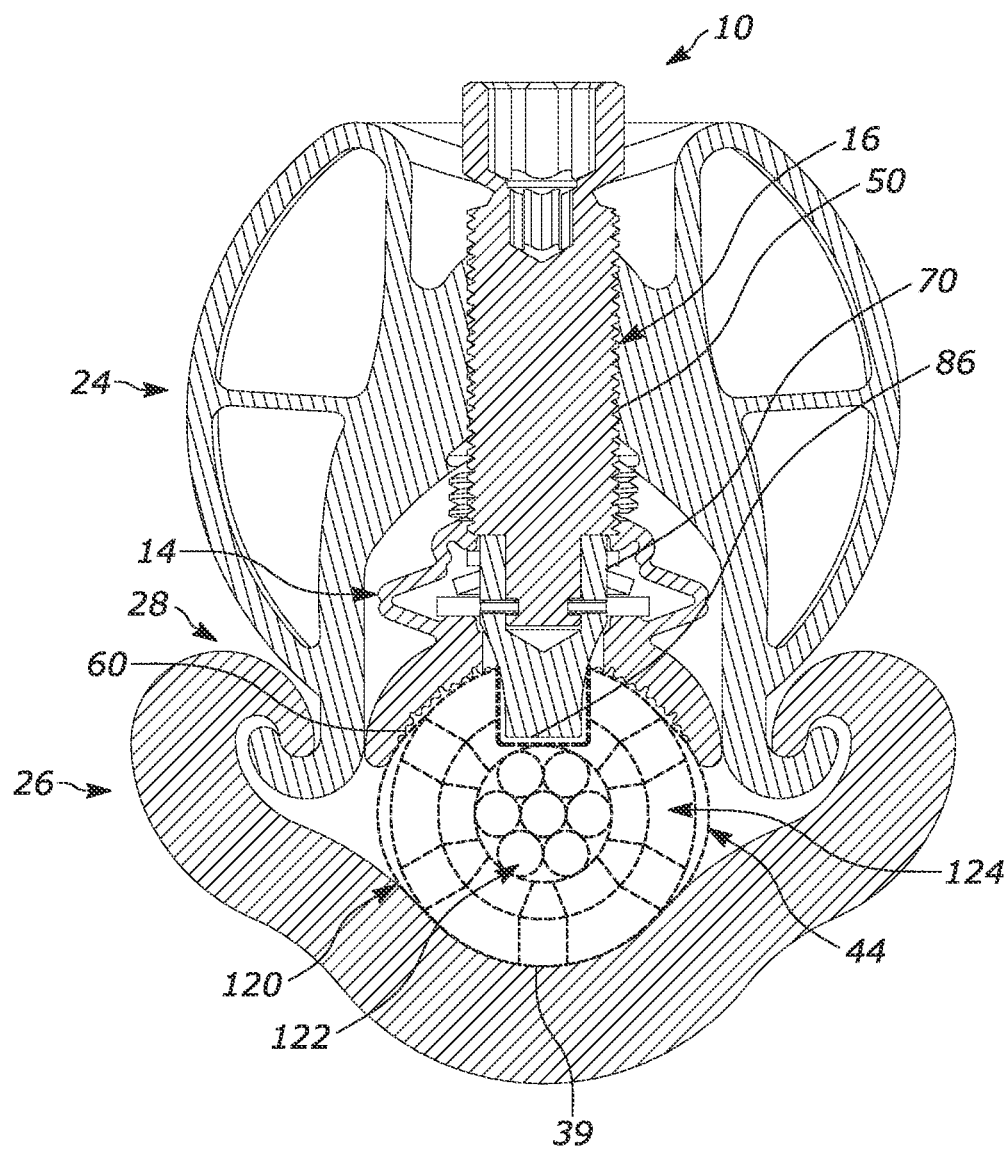
FIG. 10 of the drawings is a cross-sectional view of the fastening system, showing, in particular, a conductor clamped within the conductor cavity.

As such, to install the clamping device, the procedure is undertaken to place the conductor within the conductor cavity 44 (which process can be gleaned from the incorporated references). Once the conductor 120, having core 122 and outer conductor strands 124, as is shown in FIG. 10, is positioned within the conductor cavity 44 the next step is to tighten the clamp fasteners. Preferably, although not required, the clamp fasteners are tightened sequentially from the inner end to the outer end, and preferably in multiple passes, increasing the torque each time. In the example shown, where shear bolts are utilized, the bolts are sequentially tightened twice at torques that are lower than the breaking torque. On the final pass, the tightening is continued until the bolts shear. With the foregoing, and solely for purposes of example, and not to be deemed limiting, the torque of the fasteners when the head is designed to shear is at about 55 lbf/ft, while other values and tightening torques are contemplated as well.

To preclude inadvertent tightening of the penetrating fasteners prior to the completion of the tightening of the clamp fasteners, or prior to the desired time due to a mistake, the penetrating fasteners may be provided with a cap, such as a cap 91 (which may be a polymer based cap) so that the user will first have to remove the cap to access the tool engaging structure. Additionally, due to the differences between the keeper and the penetrating attachment, the penetrating fasteners are taller in the base provided condition.

Once the clamp fasteners have been tightened, the user can remove the caps 91 and sequentially, again, in a linear fashion, tighten each of the penetrating fasteners.

In the configuration shown, the clamp fasteners are positioned into the first two openings. Next, starting with a penetrating fastener, five sets of alternating penetrating fasteners and clamp fasteners are provided. Finally, eight clamp fasteners completely fill the remaining openings. Such a configuration allows for the stabilization of the conductor within the conductor cavity, such that when tightened, the piercing fasteners engage and pierce into the conductor. Preferably, the forces required to pierce and penetrate into the conductor are sufficient that when the proper desired torque is reached, the penetrating attachment pierces to near, at or close to the core of the conductor.

Figure 11:
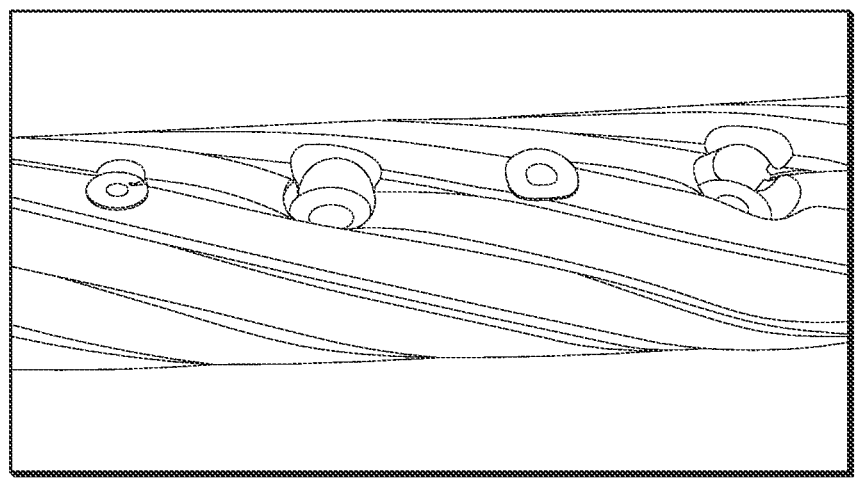
FIG. 11 is an image of a conductor after installation and removal from within a fastening system of the present disclosure.

A sample was prepared and tested. The test sample was a length of Condor 795 kcmil Type 13 ACSR-SD conductor was tested with the device of the present disclosure. In particular, a ClampStar 1386 connector available from Classic Connectors of Ohio was utilized having the clamp fasteners and the penetrating fasteners of the present disclosure. Preferably, the device is configured to have a strength sufficient to retain the conductor without damage or slip, with a pulling force equal to 60% of the Rated Break Strength (RBS). When tested with the foregoing conductor, the sample reached a maximum of 28,955 lbf, which represented 102.7% of the RBS of the conductor. An image of the conductor after removal, showing the interface of the clamp fasteners and the penetrating fasteners thereon is shown in FIG. 11. As can be seen, the penetrating fastener tip portion 86 penetrated through a depth of the conductor portion of the cable, and resisted splitting between adjoining conductor strands. Additional testing on differently sized conductors yielded results that exceeded 100% of the RBS of the conductor being tested.

It will be understood that a number of variations are contemplated, including, but not limited to the spacing between the openings, the types of fasteners utilized in conjunction with the penetrating fasteners, the configuration and dimensions of the penetrating tip (i.e., the side surface angle and shape, as well as the tip shape and surface area), among other factors. It will further be understood that a frustoconical configuration may terminate in a tip that is a sharp point, in which case the frustoconical configuration is fully conical (wherein the definition of frustoconical includes conical configurations). Preferably, however, the tip portion comprises an outwardly facing surface as opposed to a tip, while both are contemplated. It will further be understood that the degree of penetration can be varied, however, it is desirable that the conductive strands be penetrated at least 30% of the radial thickness thereof or greater, and, in some instances penetrated 100%, or to the core of the conductor. In other instances, it may be desirable to penetrate between 20% and 80% of the radial thickness of the conductive strands. The penetration of adjacent ones of the penetrating fasteners may be varied depending on the configuration of the conductor at the interface therebetween.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A electrical transmission repair device comprising:
   a first conductor clamp having an upper assembly and a lower assembly attachable together to define a conductor cavity, with a plurality of threaded openings providing ingress into the conductor cavity;
   a second conductor clamp having an upper assembly and a lower assembly attachable together to define a conductor cavity therebetween, with a plurality of threaded openings providing ingress into the conductor cavity;
   the first conductor clamp being spaced apart from the second conductor clamp with at least one connector extending therebetween to couple the first conductor clamp to the second conductor clamp;
   a plurality of penetrating fasteners extendable through at least some of the threaded openings of at least one of the first conductor clamp and the second conductor clamp, each of the penetrating fasteners further comprising:
      a threaded bolt and a penetrating portion with a proximal end at a second end region of the threaded bolt and a distal end spaced therefrom, the penetrating portion having a frustoconical configuration terminating at a tip portion, with the tip portion configured to penetrate into a conductor positioned within the conductor cavity, thereby directing a compression force onto a core of the conductor.

2. The electrical transmission repair device of claim 1 wherein the plurality of penetrating fasteners extendable through at least some of the threaded openings of each of the first conductor clamp and the second conductor clamp.

3. The electrical transmission repair device of claim 1 wherein the plurality of threaded bolts further include a removable cap extending thereover so as to identify the penetrating fasteners.

4. The electrical transmission repair device of claim 1 wherein each of the conductor cavities comprise an elongated tubular configuration defining a longitudinal axis.

5. The electrical transmission repair device of claim 1 wherein the threaded bolt of the clamp fastener and the threaded bolt of the penetrating fastener are substantially identical.

6. The electrical transmission repair device of claim 1 wherein the side surface of the penetrating portion comprises a linear frustoconical configuration.

7. The electrical transmission repair device of claim 1 wherein the side surface of the penetrating portion comprises an arcuate frustoconical configuration.

8. The electrical transmission repair device of claim 1 wherein the proximal end of the penetrating portion has a diameter that is smaller than the diameter of the at least one threaded opening.

9. The electrical transmission repair device of claim 1 further comprising:
   a plurality of clamp fasteners extendable through at least some of the threaded openings of at least one of the first conductor clamp and the second conductor clamp, each of the clamping fasteners further comprising:
   a threaded bolt and a keeper positioned at a distal end of the threaded bolt, the keeper including an outwardly concave configuration structurally configured to engage the conductor.

10. The electrical transmission repair device of claim 9 wherein the plurality of clamp fasteners is extendable through at least some of the threaded openings of each of the first conductor clamp and the second conductor clamp.

11. The electrical transmission repair device of claim 9 wherein the plurality of threaded openings of at least one of the first conductor clamp and the second conductor clamp extend between an inner end and an outer end thereof, wherein at least dome of the clamp fasteners and the penetrating fasteners are positioned in a sequentially alternating fashion.

12. The electrical transmission repair device of claim 9 wherein a clamping fastener of the plurality of clamp fasteners is extended into each of an innermost threaded opening and an outermost threaded opening of each of the first conductor clamp and the second conductor clamp.

13. The electrical transmission repair device of claim 1 wherein the plurality of threaded openings of each of the first conductor clamp and the second conductor clamp each define an axis, with the axis of each of the plurality of openings being orthogonal to the longitudinal axis of a respective one of the first conductor clamp and the second conductor clamp.

14. The electrical transmission repair device of claim 13 wherein the plurality of the threaded openings of each of the first conductor clamp and the second conductor clamp are positioned so as to be linear.

15. The electrical transmission repair device of claim 1 wherein a penetrating attachment comprising a coupling portion extending from the penetrating portion, the coupling portion including an interfacing bore into which the second end region of the threaded bolt is releasably insertable.

16. The electrical transmission repair device of claim 15 wherein at least one pin extends through respect cross-bores in each of the threaded bolt and the penetrating attachment securing the same.

17. The electrical transmission repair device of claim 15 further including a biasing assembly positioned between the penetrating attachment and the second end region, the biasing assembly including a first washer, a second washer and a Belleville washer therebetween, with the first washer engaging the threaded bolt and the second washer engaging the penetrating attachment.

* * * * *